(12) United States Patent
Henry et al.

(10) Patent No.: US 10,268,587 B2
(45) Date of Patent: *Apr. 23, 2019

(54) PROCESSOR WITH PROGRAMMABLE PREFETCHER OPERABLE TO GENERATE AT LEAST ONE PREFETCH ADDRESS BASED ON LOAD REQUESTS

(71) Applicant: VIA ALLIANCE SEMICONDUCTOR CO., LTD., Shanghai (CN)

(72) Inventors: G. Glenn Henry, Austin, TX (US); Rodney E. Hooker, Austin, TX (US); Terry Parks, Austin, TX (US); Douglas R. Reed, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 240 days.

This patent is subject to a terminal disclaimer.

(21) Appl. No.: 15/372,045

(22) Filed: Dec. 7, 2016

(65) Prior Publication Data
US 2017/0161196 A1 Jun. 8, 2017

Related U.S. Application Data

(63) Continuation of application No. 15/337,169, filed on Oct. 28, 2016.
(Continued)

(51) Int. Cl.
*G06F 12/00* (2006.01)
*G06F 12/0862* (2016.01)
(Continued)

(52) U.S. Cl.
CPC ...... *G06F 12/0862* (2013.01); *G06F 9/30047* (2013.01); *G06F 9/3802* (2013.01);
(Continued)

(58) Field of Classification Search
CPC ............ G06F 12/0855; G06F 12/0862; G06F 12/0875; G06F 12/0897; G06F 2212/602;
(Continued)

(56) References Cited

U.S. PATENT DOCUMENTS 5,802,569 A  9/1998 Genduso et al.
5,819,097 A  10/1998 Brooks et al.
(Continued)

OTHER PUBLICATIONS

Barat, Francisco. et al. "Reconfigurable Instruction Set Processors; a Survey." IEEE International Workshop on Rapid System Prototyping. Jun. 21, 2000. pp. 168-173.
(Continued)

*Primary Examiner* — Mardochee Chery
(74) *Attorney, Agent, or Firm* — McClure, Qualey & Rodack, LLP

(57) ABSTRACT

A processor including a front end, at least one load pipeline, and a memory system that further includes a programmable prefetcher for prefetching information from an external memory. The front end converts fetched program instructions into microinstructions including load microinstructions and dispatches microinstructions for execution. The load pipeline executes dispatched load microinstructions and provides load requests to the memory system. The programmable prefetcher includes a load monitor, a programmable prefetch engine, and a prefetch requester. The load monitor tracks the load requests. The prefetch engine is configured to be programmed by at least one prefetch program to operate as a programmed prefetcher, such that during operation of the processor, the programmed prefetcher generates at least one prefetch address based on the load requests issued by the processor. The prefetch requester submits the at least one prefetch address to prefetch information from the memory system.

16 Claims, 8 Drawing Sheets

Related U.S. Application Data

(60) Provisional application No. 62/264,816, filed on Dec. 8, 2015.

(51) Int. Cl.
| | | |
|---|---|---|
| *G06F 9/38* | (2018.01) | |
| *G06F 12/0875* | (2016.01) | |
| *G06F 12/0897* | (2016.01) | |
| *G06F 12/0855* | (2016.01) | |
| *G06F 9/30* | (2018.01) | |

(52) U.S. Cl.
CPC ...... *G06F 12/0855* (2013.01); *G06F 12/0875* (2013.01); *G06F 12/0897* (2013.01); *G06F 9/3814* (2013.01); *G06F 9/3867* (2013.01); *G06F 2212/452* (2013.01); *G06F 2212/602* (2013.01); *G06F 2212/6022* (2013.01); *G06F 2212/6028* (2013.01)

(58) Field of Classification Search
CPC ..... G06F 2212/6022; G06F 2212/6028; G06F 9/30047; G06F 9/3802; G06F 9/3814; G06F 9/3867
USPC .......................................................... 711/137
See application file for complete search history.

(56) References Cited

U.S. PATENT DOCUMENTS

| | | | |
|---|---|---|---|
| 6,138,229 | A | 10/2000 | Kucukcakar et al. |
| 6,415,377 | B1 | 7/2002 | Van Der Wolf et al. |
| 6,453,407 | B1 | 9/2002 | Lavi et al. |
| 7,079,147 | B2 | 7/2006 | Wichman et al. |
| 7,873,814 | B1 | 1/2011 | Cohen et al. |
| 8,473,724 | B1 | 6/2013 | Kenville et al. |
| 2003/0079089 | A1 | 4/2003 | Barrick et al. |
| 2003/0208723 | A1 | 11/2003 | Killian et al. |
| 2004/0268007 | A1 | 12/2004 | Nguyen et al. |
| 2005/0081014 | A1 | 4/2005 | Tran et al. |
| 2007/0101105 | A1 | 5/2007 | Diefendorff |
| 2009/0167351 | A1 | 7/2009 | Agarwal et al. |
| 2010/0205404 | A1 | 8/2010 | Henry et al. |
| 2012/0260042 | A1 | 10/2012 | Henry et al. |
| 2013/0254485 | A1 | 9/2013 | Kannan et al. |
| 2014/0181415 | A1 | 6/2014 | Loh et al. |
| 2015/0106596 | A1 | 4/2015 | Vorbach et al. |
| 2016/0179544 | A1* | 6/2016 | Heinecke ............... G06F 9/3802 712/207 |
| 2017/0161036 | A1 | 6/2017 | Henry et al. |
| 2017/0161037 | A1 | 6/2017 | Henry et al. |
| 2017/0161067 | A1 | 6/2017 | Henry et al. |
| 2017/0161195 | A1 | 6/2017 | Henry et al. |

OTHER PUBLICATIONS

Bertels, Koen et al. "The MOLEN Polymorphic Processor." IEEE Transactions on Computers. vol. 53, No. 11, Nov. 2004. pp. 1363-1375.

Barat, Francisco et al. "Reconfigurable Instruction Set Processors from a Hardware/Software Perspective." *IEEE Transations on Software Engineering*. vol. 27, No. 9, Sep. 2002. pp. 847-862.

Grad, Mariusz et al. "Just-in-Time Instruction Set Extension—Feasibility and Limitations for an FPGA-Based Reconfigurable ASIP Architecture." Paralel and Distributed Processing Workshops and PHD Forum (IPDPSE). 2011 IEEE International Symposium on IEEE. May 16, 2011. pp. 278-285. XP03194781.

\* cited by examiner

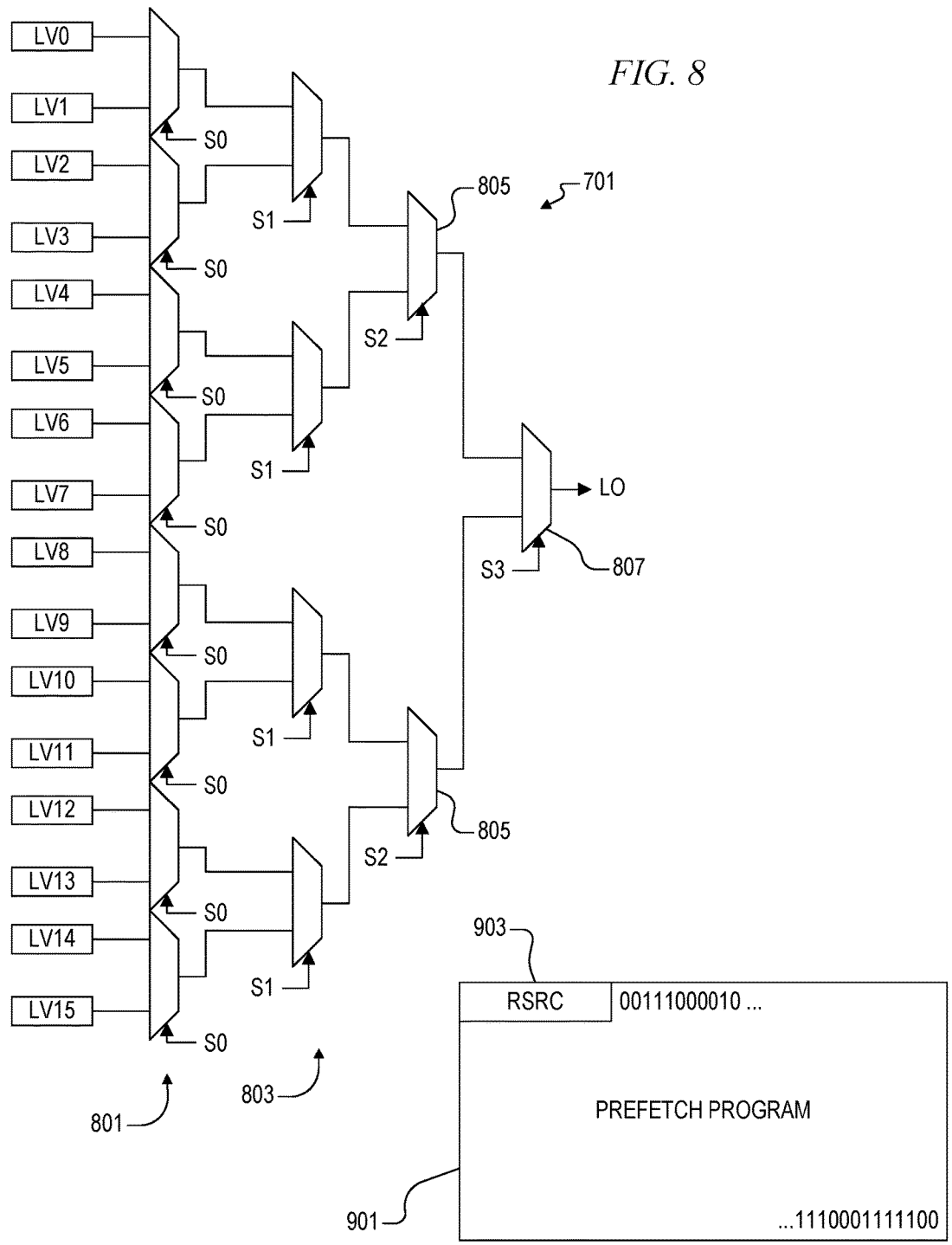

PROCESSOR WITH PROGRAMMABLE PREFETCHER OPERABLE TO GENERATE AT LEAST ONE PREFETCH ADDRESS BASED ON LOAD REQUESTS

CROSS REFERENCE TO RELATED APPLICATION(S)

This application is a continuation of the following U.S. Patent Application which is hereby incorporated by reference in its entirety for all intents and purposes.

| SER. NO. | FILING DATE | TITLE |
|---|---|---|
| 15/337,169 | Oct. 28, 2016 | PROCESSOR WITH PROGRAMMABLE PREFETCHER |

BACKGROUND OF THE INVENTION

Field of the Invention

The present invention relates in general to prefetching information for a processor, and more particularly to a programmable prefetcher that performs prefetch operations according to a programmed prefetch program.

Description of the Related Art

Processors continue to become more powerful with greater performance at higher efficiency levels. The term "processor" as used herein refers to any type of processing unit, including a microprocessor, a central processing unit (CPU), one or more processing cores, a microcontroller, etc. The term "processor" as used herein also includes any type of processor configuration, such as processing units integrated on a chip or integrated circuit (IC) including those incorporated within a system on a chip (SOC) or the like. Semiconductor manufacturing techniques are continually being improved to increase speed, reduce power consumption and reduce the size of circuitry integrated on a processing chip. The reduction of integration size allows additional functionality to be incorporated within the processing unit. Once a conventional processor is manufactured, however, many of its internal functions and operations are essentially fixed.

Memory access latency is a significant factor that impacts processing performance and efficiency. Processing circuitry is often separated from main memory through multiple layers of circuitry and associated access protocols. For example, a processor may be coupled to an external system memory that stores information needed by the processor, such as instructions (e.g., code), data and other information. Access to the external system memory may be relatively slow since the information must often traverse multiple levels of circuitry, such as a bus interface unit and/or a memory controller and the like, and the external devices often operate with a slower system clock as compared to a faster processor or core clock.

In order to improve performance and efficiency, processors typically incorporate one or more levels of cache memory that locally stores information retrieved from external memory for faster access by processing circuitry. Access to an internal cache is substantially faster since the cache is physically closer, has fewer intermediate circuitry levels, and often operates at a faster clock speed. The processor executes load-type instructions with an address for accessing the requested information (e.g., data or instructions). When the requested information is located in an internal cache invoking a cache hit, the information is retrieved with minimal latency. Otherwise, a cache miss occurs and the information is retrieved from higher cache levels and/or system memory located external to the processing core or processor with greater latency as compared to internal cache memory. The retrieved information may be in the form of one or more cache lines incorporating the requested information. As processing continues and as the internal processor caches are filled, an increased percentage of cache hits occur thereby improving overall processor performance.

Prefetching is a commonly used technique in which blocks of information are retrieved from external system memory in advance and stored into the local processor cache(s) for faster access by the processing circuitry when needed. A "prefetcher" or prefetch engine monitors or tracks information (data and/or code) actually requested by the processor and attempts to anticipate future requests, and then submits requests to retrieve the anticipated information. Performance and efficiency, however, are only improved when the processing circuitry actually requests a significant proportion of the anticipated information in a timely fashion. A prefetching algorithm that does not retrieve the target information or otherwise retrieves too much of the wrong information may not appreciably increase overall performance and efficiency. In fact, inaccurate or otherwise inefficient prefetch algorithms may negatively impact overall performance and efficiency.

Conventional processors with internal caching mechanisms often include one or more "prefetchers" that are each preconfigured according to a predetermined prefetch algorithm. Many different types of prefetchers are known which vary from relatively simple to somewhat complex. Some prefetchers are based on a relatively simple algorithm, such as a determining and fetching based on a stride or cache line offset (e.g., such as every other cache line or every third or fourth cache line or the like). Other prefetchers are more complex. A bounding box prefetcher, for example, tracks multiple different pattern periods and attempts to identify a clear pattern period used for prefetching. A content-directed prefetcher examines the actual data that has been retrieved in an attempt to identify addresses that will be requested in the near future.

Although a given prefetcher might work very well for one process (program or application or the like), it may not perform so well or may even perform very poorly for another. Some processors may incorporate multiple prefetchers in an attempt to improve performance for a variety of different processes. Although a multiple simultaneous prefetcher approach may improve operation for some processes, such improvements may be limited because multiple prefetchers tend to thrash and conflict with each other.

SUMMARY OF THE INVENTION

A processor according to one embodiment includes a front end, at least one load pipeline, and a memory system that further includes a programmable prefetcher for prefetching information from an external memory. The front end converts fetched program instructions into microinstructions including load microinstructions and dispatches microinstructions for execution. The load pipeline executes dispatched load microinstructions and provides load requests to the memory system. The programmable prefetcher includes a load monitor, a programmable prefetch engine, and a prefetch requester. The load monitor tracks the load requests. The programmable prefetch engine is configured to be programmed by at least one prefetch program to operate as a programmed prefetcher, such that during operation of the processor, the programmed prefetcher generates at least one prefetch address based on the load requests issued by the processor. The prefetch requester submits the at least one prefetch address to prefetch information from the memory system.

The processor may further include a prefetch memory for storing one or more prefetch programs. The prefetch memory may include a random-access memory (RAM) or the like. The processor may be responsive to a write command that commands the processor to write a prefetch program into the random-access memory. A prefetch programmer may be included that programs the programmable prefetch engine using one or more prefetch program stored in the prefetch memory.

In addition, the prefetch memory may include a read-only memory (ROM) or the like for storing one or more predetermined prefetch programs for programming the programmable prefetch engine to operate according to a predetermined prefetch definition. Once such predetermined prefetch program may be a default prefetch program, in which the prefetch programmer uses the default prefetch program to program the programmable prefetch engine upon startup of the processor.

The processor may be responsive to a configure command which causes the prefetch programmer to program the programmable prefetch engine with a specified one of multiple prefetch programs stored in the prefetch memory. The processor may include a configuration map that maps each of multiple different processes with a corresponding prefetch program stored in the prefetch memory.

The programmable prefetch engine may be implemented with programmable logic elements and programmable interconnectors. The programmable logic elements and programmable interconnectors may be subdivided into multiple substantially identical programmable sections. A prefetch programmer may be included that allocates a number of the programmable sections and that programs the allocated sections with a prefetch program to configure a programmed prefetcher. The programmable logic elements may be implemented as programmable lookup tables. The programmable logic elements may be implemented as adders, multiplexers, and registers. The programmable prefetch engine may include a programmable memory in which the prefetch program is configured as a bitstream that is scanned into the programmable memory of the programmable prefetch engine. The programmable prefetch engine may be programmed with multiple prefetch programs, in which a prefetch programmer enables at least one prefetch program at a time during operation of the processor.

The memory system may include a cache that receives the load requests issued by the processor and that requests and stores corresponding cache lines from the external memory. The cache may be a unified cache that receives code and data load requests, such as, for example, an L2 cache or the like.

BRIEF DESCRIPTION OF THE DRAWINGS

The benefits, features, and advantages of the present invention will become better understood with regard to the following description, and accompanying drawings where:

FIG. 8 is a schematic diagram of the look-up table (LUT) of FIG. 7 implemented according to one embodiment of the present invention;

FIG. 9 is a simplified block diagram of a format of the prefetch program for programming the PPF engine of FIG. 4 according to one embodiment of the present invention;

DETAILED DESCRIPTION

The inventors have recognized the inefficiencies associated with predetermined prefetchers that exist in conventional processors. They have therefore developed a programmable prefetcher that is configurable or otherwise programmable to operate as a more effective prefetcher for a given process. A programmer or developer of a particular software program or process is in the ideal position to know what information the process needs to load into the processor over time. The programmer or developer may then design an optimal prefetcher that performs prefetch operations that more accurately predict the information that will be needed by the process in the near future. Alternatively, an existing application or process may be evaluated for designing a more effective prefetcher. The programmable prefetcher may be programmed accordingly so that during process operation, an increased amount of correctly anticipated information may be loaded ahead of time into a local cache within the processor to be immediately available when needed by the process.

Figure 1:
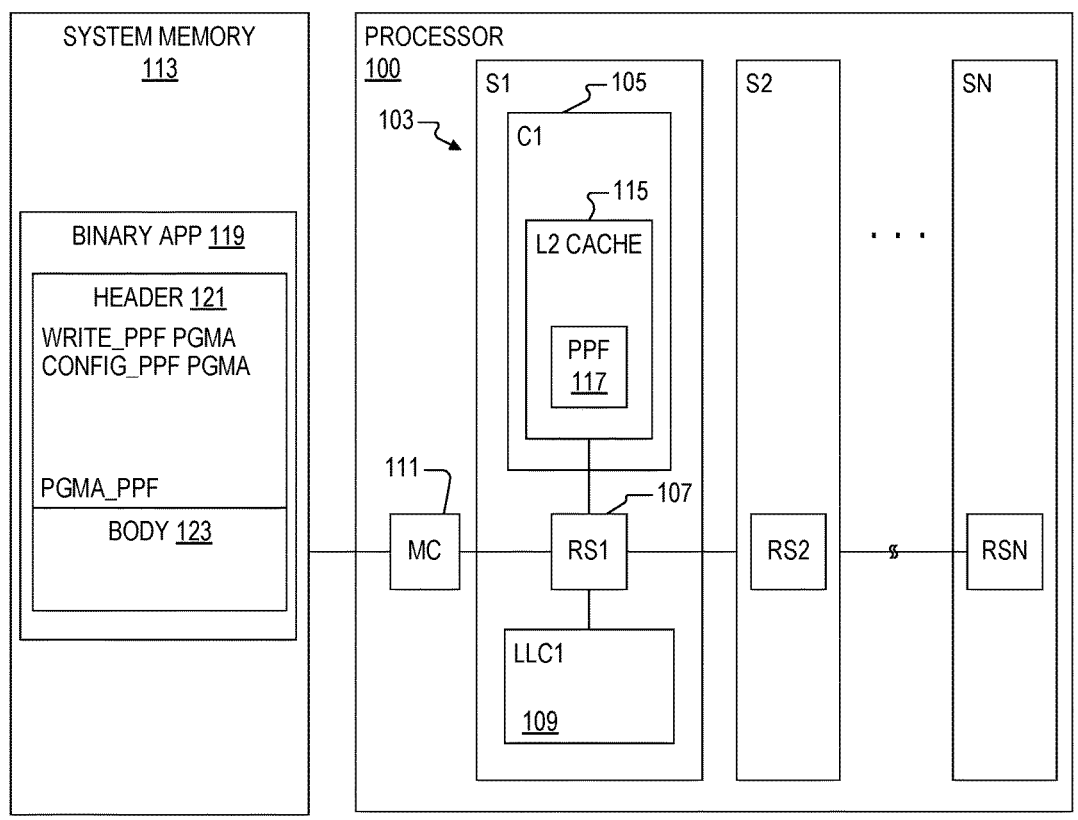
FIG. 1 is a simplified block diagram of a processor incorporating a programmable prefetcher implemented according to one embodiment of the present invention.

FIG. 1 is a simplified block diagram of a processor 100 incorporating a programmable prefetcher (PPF) 117 implemented according to one embodiment of the present invention. The standard instruction set architecture (ISA) of the processor 100 may be an x86 architecture in which it can correctly execute a majority of the application programs that are designed to be executed on an x86 processor. An application program is correctly executed if its expected results are obtained. In particular, the processor 100 executes instructions of the x86 instruction set and includes the x86 user-visible register set. The present invention, however, is not limited to x86 architectures so that the processor 100 may be implemented according to any alternative ISA as known by those of ordinary skill in the art.

The processor 100 includes N slices 103, individually labeled S1, S2, . . . , SN, in which N is any positive integer including 1 (i.e., the processor 100 includes at least one slice and may include only one processing core). The details of the first slice S1 are shown and described further, where it is understood that each of the remaining slices S2-SN may be implemented in substantially similar manner. The first slice S1 includes a first processing core C1 105, which further incorporates a second level or level-2 (L2) cache 115. The L2 cache 115 further incorporates the PPF 117. Each processing core of the remaining slices S1-SN may include a similar L2 cache and PPF (not shown). The processing core 105 is coupled to a ring stop RS1 107, which is further coupled to a "last level cache" (LLC) 109, labeled LLC1. Each of the remaining slices S2-SN includes a similar ring stop, individually labeled as ring stops RS2-RSN, which are each further coupled between a corresponding processing core and LLC of corresponding slices.

In the illustrated configuration, the ring stops RS1-RSN are each coupled together in a ring configuration which is further coupled to a memory controller (MC) 111 incorporated on the processor 100. The MC 111 is further coupled to an external system memory 113. In an alternative embodiment, the MC 111 may be provided external to the processor 100 in which the processor 100 includes a bus interface unit or the like (not shown) for interfacing an external memory controller and the system memory 113. The slices S1-SN share the resources of the system memory 113, and may also share information with each other via the ring stops RS1-RSN. It is appreciated that the processor 100 may be configured as a single core processor incorporating a single PPF rather than multiple slices.

The system memory 113 stores an executable binary application (APP) 119, which further includes a header 121 and a main body 123. The binary APP 119 is shown in generic form and may be implemented as a binary executable (.EXE) file, a bytecode file (.NET, Java, etc.), or any other type of executable code that may be successfully executed by any one or more of the processing cores of the processor 100 including the processing core C1. In the illustrated configuration, the header 121 includes at least one PPF write instruction, in which each write instruction is provided for specifying or locating a corresponding prefetch program (PGM) that may be used to program the PPF 117. As shown, for example, the header 121 includes a PPF write instruction WRITE_PPF that includes an operand (or argument) PGMA that identifies a corresponding prefetch program PGMA_PPF incorporated within the header 121. Alternatively, the prefetch program PGMA_PPF may be provided within a different section of the binary APP 119. In any case, the operand PGMA may be an address or offset used to locate the prefetch program PGMA_PPF within the binary APP 119 and/or system memory 113. Although the binary APP 119 includes only one PPF write instruction that identifies a corresponding prefetch program, an executable binary application may include any number of PPF write instructions for loading any number of prefetch programs that may be loaded into the processor 100 at any given time.

During operation, the processing core C1 accesses the binary APP 119 and executes the WRITE_PPF instruction, uses the operand PGMA to locate the prefetch program PGMA_PPF, and then loads the prefetch program PGMA_PPF into the PPF 117. Alternatively, the prefetch program PGMA_PPF may be written into any other memory accessible by the PPF 117 within the processing core C1. The header 121 further includes a PPF configuration instruction CONFIG_PPF with operand PGMA, which instructs the processing core C1 to program the PPF 117 with the prefetch program PGMA_PPF that was previously loaded into the PPF 117 (or other internal memory of the processing core C1). In an alternative configuration, a single command may be used that when executed, causes the processing core C1 to use the operand PGMA to locate the prefetch program PGMA_PPF, and then to directly program the PPF 117.

After the PPF 117 is programmed with the prefetch program PGMA_PPF, the PPF 117 is activated to operate as a prefetcher during execution of binary APP 119. Then, during execution of the body 123 of the binary APP 119, the PPF 117 performs prefetching functions according to the prefetch program PGMA_PPF. The prefetch program PGMA_PPF may be specifically configured for the APP 119, so that prefetching functions are performed by the PPF 117 with greater performance and at higher efficiency levels than more generalized or generic prefetch functions using conventional predetermined prefetch approaches. The PPF 117 is a "programmed" prefetcher when programmed with a prefetch program. The PPF 117 is a "custom" prefetcher when programmed with a prefetch program that is specifically designed for a particular application or application type.

The system memory 113 (and/or other external memory) may include multiple application programs that are loaded for execution by the processor 100 over time. Multiple applications or processes may be loaded into any one or more of the processing cores C1-CN, although each processing core typically executes only one process at a time in the illustrated embodiment. Embodiments in which each processing core executes multiple processes at a time are contemplated. Multiple application programs may be assigned for execution by one of the processing cores. An operating system (OS) includes a scheduler or the like that schedules execution of the application programs of the processor 100 including swapping in and out each multiple processes for execution, one at a time, for a given processing core. Multiple applications may be executed by a given processing core, such as the processing core C1 105, in which each application may include one or more prefetch programs for programming the PPF 117. Although the PPF 117 may have sufficient resources to handle multiple prefetch programs for multiple processes, the PPF 117 is a limited resource and may be reprogrammed with different prefetch programs during operation as further described herein.

Figure 2:
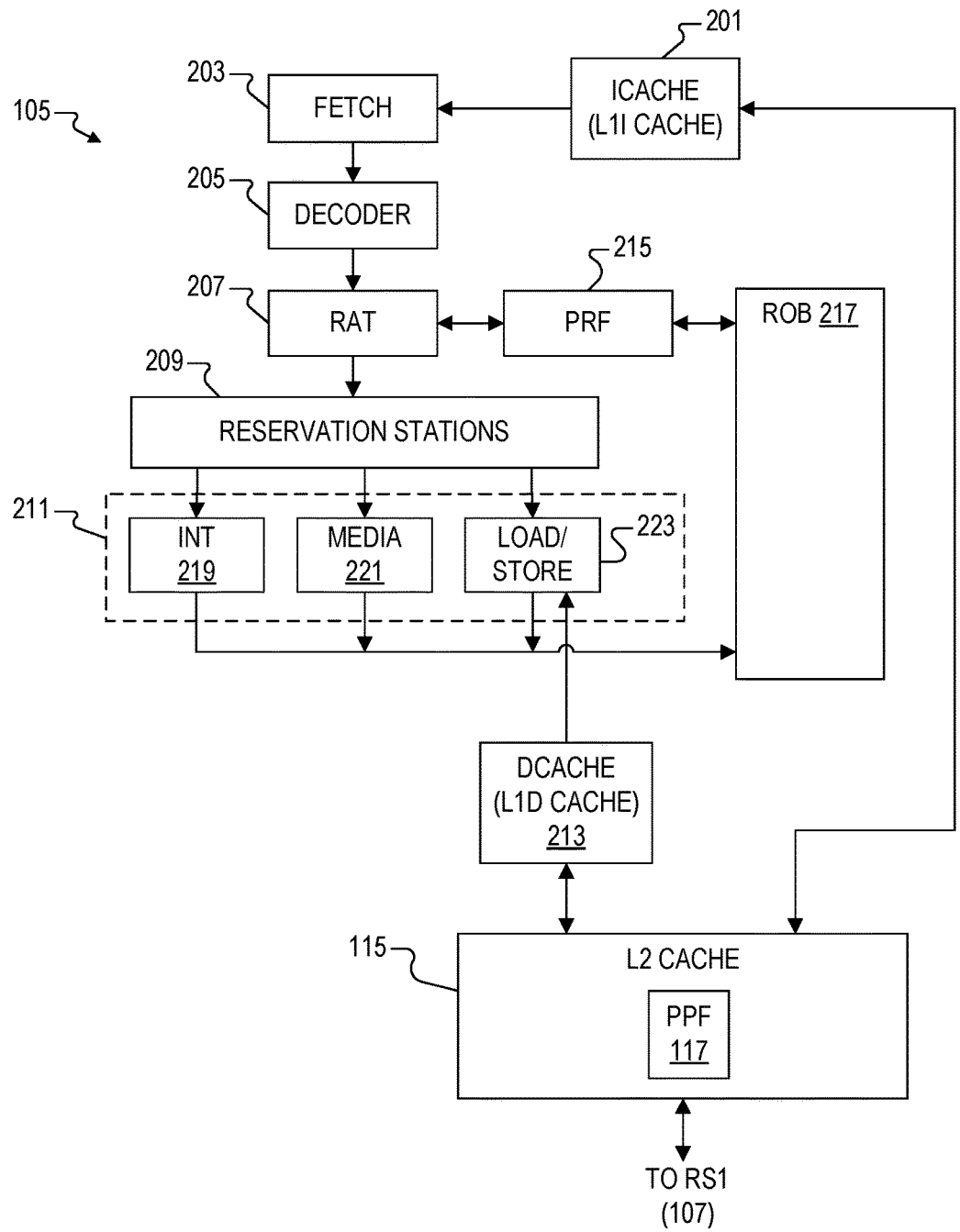
FIG. 2 is a simplified block diagram of the processing core C1 of FIG. 1 implemented according to one embodiment of the present invention.

FIG. 2 is a simplified block diagram of the processing core C1 105 implemented according to one embodiment of the present invention. In the illustrated embodiment, the processing core C1 includes an instruction cache (ICACHE) 201 which is a first level or level-1 instruction (L1I) cache, a front end pipe including an instruction fetch (FETCH) engine 203, a decoder 205, a register alias table (RAT) 207, and further includes reservation stations 209, execution units 211, a data cache (DCACHE) 213, which is a level-1 data (L1D) cache, the level-2 or L2 cache 115, a physical register file (PRF) 215 and a reorder buffer (ROB) 217. The L2 cache 115 further interfaces the ring stop RS1 for ultimately accessing the LLC1 109 and/or the system memory 113.

The execution units 211 may include one or more integer (INT) units 219, one or more floating point or media units 221, one or more load and store pipelines (load/store pipes) 223, and the PEU1 101. The load/store pipes 223 may be configured as separate load and store pipelines and/or load and store combination pipes, and may further incorporate a memory order buffer (MOB) (not shown) or the like. The reservation stations 209 may include any combination of schedulers for dispatching instructions to the individual execution units 211. For example, separate integer, media and load/store schedulers may be included for dispatching instructions to the INT units 219, the media units 221 and the load/store pipes 223, respectively.

The ICACHE 201 caches program instructions from an active application located in the system memory 113, such as the binary APP 119. The fetch engine 203 fetches program instructions (e.g., macroinstructions or code) from the ICACHE 201 and forwards them to the decoder 205, which decodes them into microinstructions for execution by one or more of the execution units 211. In one embodiment, instruction translation is a process that translates the macroinstructions (or macro-ops) of a macroinstruction set of the processor 100 (such as the x86 instruction set architecture) into microinstructions (or micro-ops) of a microinstruction set architecture of the processing core C1. As used herein, the macroinstructions and microinstructions may generally be referred to herein generally as "instructions" and more specifically as macro-ops and micro-ops, respectively. For example, a memory access instruction may be decoded into a sequence of micro-ops that includes one or more load or store micro-ops. The binary APP 119 is populated with macro-ops, which are converted by the decoder 205 into corresponding micro-ops that are part of the native instruction set of the processor 100. The RAT 207 generates dependency information for each instruction based on its program order, on the operand sources it specifies, and on renaming information.

The RAT 207 dispatches the decoded micro-ops and their associated dependency information to the RS 209. The RS 209 includes at least one queue that holds the instructions and dependency information received from the RAT 207. The RS 209 dispatches received instructions to corresponding ones of the execution units 211 when they are ready to be executed. An instruction is considered ready for execution when all of its dependencies are resolved. In conjunction with dispatching an instruction, the RAT 207 allocates an entry in the ROB 217 for the instruction. Thus, the instructions are allocated in program order into the ROB 217, which may be configured as a circular queue to ensure that the instructions are retired in program order. The RAT 207 also provides the dependency information to the ROB 217 for storage in the instruction's entry therein. The RAT 207 further allocates or maps one or more physical registers within the PRF 215 for each instruction for storage of operands and results.

The results of the execution units 211 may be fed back to the ROB 217 to update corresponding registers within the PRF 215. In one embodiment, the RAT 207 maps architectural registers to physical registers in the PRF 215 and updates pointers or the like (not shown) in the ROB 217 corresponding to the instructions. The pointers in the ROB 217 may be updated during or after execution, and the pointers are used to update contents of registers within the PRF 215 during operation. The ROB 217 ultimately retires instructions in program order to ensure proper operation in accordance with the instructions of the binary APP 119.

Each of the processing cores of the processor 100, including the processing core C1, is superscalar and includes multiple execution units and is capable of issuing multiple instructions to the execution units 211 in a single clock cycle. The processing core C1 is also configured to perform out-of-order execution. That is, the reservation stations 207 may issue instructions out of the order specified by the program that includes the instructions. Superscalar out-of-order execution processors typically attempt to maintain a relatively large pool of outstanding instructions so that they can take advantage of a larger amount of instruction parallelism. The processing core C1 may also perform speculative execution of instructions in which it executes instructions, or at least performs some of the actions prescribed by the instruction, before it is know for certain whether the instruction will actually complete. An instruction may not complete for a variety of reasons, such as a mispredicted branch instruction, exceptions (interrupts, page faults, divide by zero conditions, general protection errors, etc.), and so forth. Although the processing core C1 may perform some of the actions prescribed by the instruction speculatively, it does not update the architectural state of the system with the results of an instruction until it is known for certain that the instruction will complete. This may be determined, for example, when the instruction is retired by the ROB 217.

The ICACHE 201 is an L1 cache for handling program instructions or code retrieved from the system memory 113, whereas the DCACHE 213 is an L1 cache for handling data retrieved from or sent to the system memory 113. The L2 cache 115 is a "unified" cache in that it incorporates both data and code information to and from the L1 caches 201 and 213. In such a cache hierarchy, the L1 caches are typically smaller and faster with fewer sets and/or ways, whereas the higher level caches (e.g., L2) are larger (and often slower). Each core of the processor 100 executes load-type instructions with an address for accessing the requested information (e.g., data or instructions). When the requested information is located in a corresponding L1 cache invoking a cache hit, the information is retrieved with minimal latency. Otherwise, if the requested information is located within the L2 cache 115, the information is retrieved with reduced latency since the L2 is much faster than higher level caches (e.g., LLC1 109) and/or system memory 113. Otherwise, a cache miss occurs within the processing core C1 105 and the information is retrieved from the LLC1 109 and/or the system memory 113 with greater latency. The retrieved information may be in the form of one or more cache lines incorporating the requested information. As processing continues and as the processor L1 and L2 caches are filled, an increased percentage of cache hits occur thereby improving overall processor performance. The PPF 117 may be programmed as a custom prefetcher for at least one process to optimize overall performance of the processing core C1 as further described herein.

Figure 3:
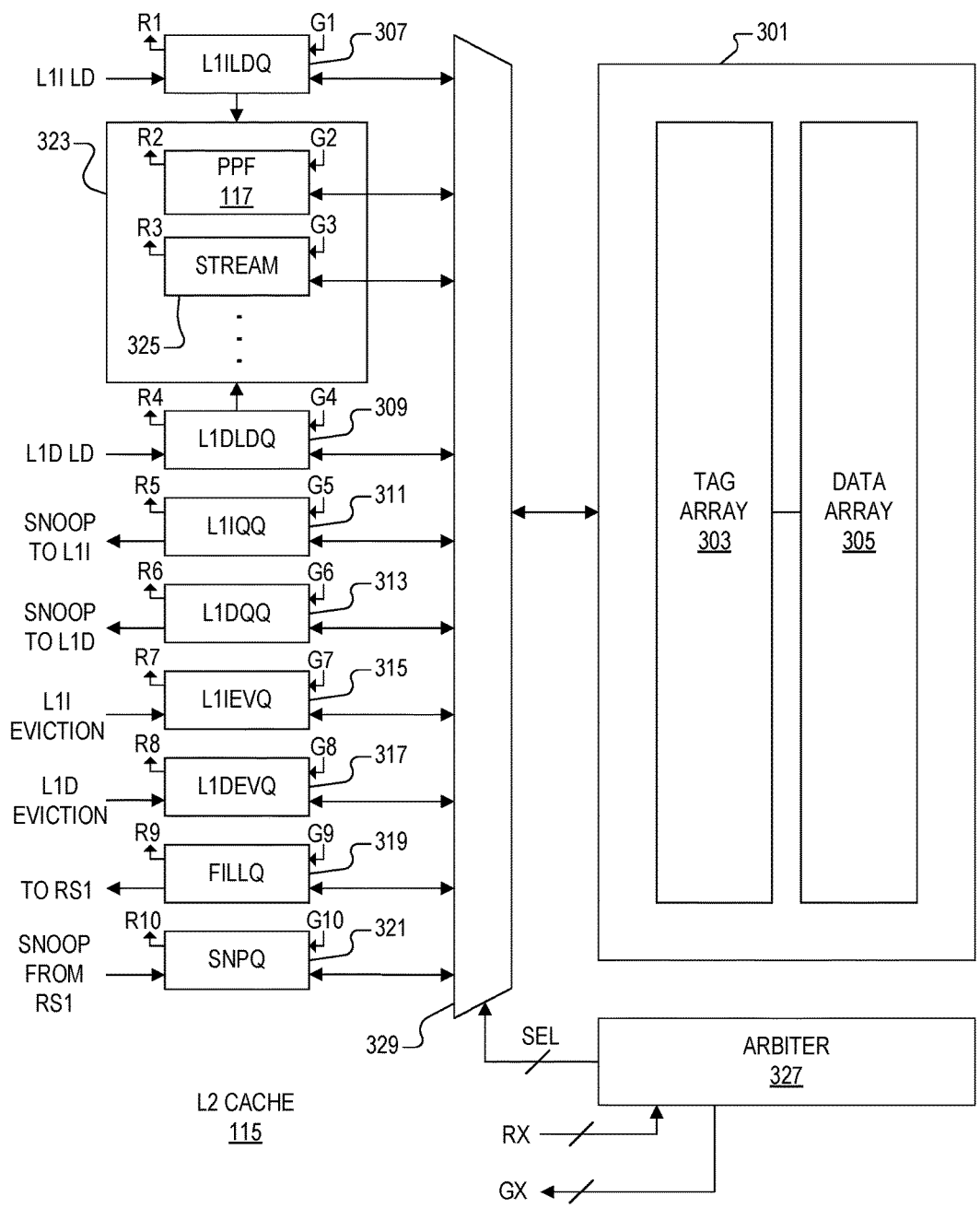
FIG. 3 is a simplified block diagram of the L2 cache including the programmable prefetcher of FIG. 1 implemented according to one embodiment of the present invention.

FIG. 3 is a simplified block diagram of the L2 cache 115 including the PPF 117 implemented according to one embodiment of the present invention. The main portion of the L2 cache 115 is a "pipeline" 301 incorporating a tag array 303 interfacing a data array 305. The data array 305 is the primary memory storage area of the L2 cache 115 for temporarily storing cache lines incorporating information (data and code) retrieved from and for storage into the system memory 113. The tag array 303 includes a list of tags each used to identify a corresponding storage area of the system memory 113 to which associated cache lines stored in the data array 305 correspond, and further includes MESI bits to reflect the state of the cache lines. In one embodiment, the L2 cache 115 is an N-way set associative cache. An upper portion of the address forms the tag identifying a block or page in memory, and a next or mid portion of the address forms an index identifying one of multiple sets within the tag array and the data array 305. Each set of each array includes N ways, in which each of the N ways of a given set within the data array 305 corresponds to a tag within the tag array 303.

In a more specific embodiment, the physical address (PA) size of each core of the processor 100 includes 46 bits, and the L2 cache 115 has a capacity of 256 Kilobytes (KB), includes 16 ways for each of 256 sets, has a cache line size of 64 Bytes (B) and has a tag size of 32 bits. The tag is the upper 32 bits of the 46-bit PA identifying a corresponding memory block of the system memory 113. The present invention, however, is not limited to any particular physical address, cache capacity, number of sets or ways, cache line size or tag size.

The L2 cache 115 includes multiple queues for transferring information between the ICACHE 201, the DCACHE 213, and the RS1 107. An L1ILDQ 307 enqueues incoming load requests (L1I LD) from the ICACHE 201 to the L2 cache 115, an L1DLDQ 309 enqueues incoming load requests (L1D LD) from the DCACHE 213 to the L2 cache 115, an L1IQQ 311 enqueues outgoing snoops to the ICACHE 201 from the L2 cache 115, an L1DQQ 313 enqueues outgoing snoops to the DCACHE 213 from the L2 cache 115, an L1IEVQ 315 enqueues incoming evictions from the ICACHE 201 to the L2 cache 115, an L1DEVQ 317 enqueues incoming evictions from the DCACHE 213 to the L2 cache 115, a FILLQ 319 enqueues outgoing load and eviction requests from the L2 cache 115 to the RS1 107, and a SNPQ 321 enqueues incoming snoops from the RS1 107 to the L2 cache 115.

The L2 cache 115 further includes one or more prefetchers 323, each performing a corresponding prefetch operation for prefetching information from the system memory 113 into the L2 cache 115 according to a corresponding prefetch algorithm or definition. The prefetchers 323 include the PPF 117 which is programmable to operate as a prefetcher according to any type of prefetch definition including custom prefetch definitions as further described herein. One or more standard or preconfigured prefetchers 323 may be included depending upon the particular configuration. As shown, for example, a stream prefetcher 325 is included that operates according to a predetermined stream prefetch algorithm. The stream prefetcher 325 is not further described. Additional predetermined and conventional prefetchers may be included but are not further shown or described.

Each of the queues 307-321 and each of the prefetchers 323 (including the PPF 117) assert a corresponding one of multiple request signals RX (individually shown as R1-R10) to an arbiter 327 to request access to the pipeline 301 for retrieving or for storing data and information. The arbiter 327 arbitrates among received requests RX and asserts a corresponding one of multiple grant signals GX (individually shown as G1-G10) to one of the queues 307-321 or one of the prefetchers 323 to grant access to the pipeline 301. In order to grant access, the arbiter 327 asserts a corresponding one of the set of select signals SEL to the select inputs of select logic 329 to couple the winning queue or prefetcher access to the pipeline 301, and then asserts the corresponding grant signal GX to the winning queue or prefetcher. Additional handshaking protocol and pipeline 301 connections and operations are not further described.

Each of the prefetchers 323, including the PPF 117, tracks or otherwise monitors the load requests L1I LD and L1D LD from the ICACHE 201 and the DCACHE 213 to the queues L1ILDQ 307 and L1DLDQ 309 in order to identify and initiate prefetch requests (when active or otherwise enabled). Each prefetcher 323 may monitor the load requests directly or instead may access and review entries within each of the queues L1ILDQ 307 and L1DLDQ 309. Each of the load requests L1I LD and L1D LD includes an address (e.g., physical address PA) to locate information being requested along with a type of load request. Each prefetcher 323 uses this information to track operation of the processing core C1 to determine potential future load requests to be made along with corresponding addresses.

When a prefetcher 323 determines at least one potential prefetch address to load, it asserts its corresponding request signal RX to the arbiter 327 to gain access to the pipeline 301. For example, when the PPF 117 identifies at least one prefetch address, it asserts R2 to the arbiter 327. When its corresponding grant signal GX is received (e.g., G2 for the PPF 117), the prefetcher 323 queries the pipeline 301 to determine whether the information already resides within the data array 305 and is valid. In one embodiment, for example, the corresponding tag portion of the prefetch address is compared with each tag of each of multiple ways within the selected set (identified by index portion of the address) of the tag array 303. In the event of a hit, such as when the cache line associated with the prefetch address already resides within the data array 305 and is valid, the prefetch address is discarded since a prefetch operation is not necessary. In the event of a miss, meaning that the cache line associated with the prefetch address is not found within the data array 305 or is otherwise invalid, then the prefetcher inserts the prefetch address into the queue FILLQ 319 (or otherwise submits a request for the prefetch address to the FILLQ 319). The FILLQ 319 eventually asserts a request to the RS1 107 along with the prefetch address to retrieve the cache line from the system memory 113.

If the processing core C1 subsequently asserts a load request for the same cache line associated with the prefetch address, then the cache line may already have been loaded into the pipeline 301 so that the requested information is returned to the processing core C1 with minimal delay. Even if not already loaded within the data array 305, the prefetch request has already been initiated by the FILLQ 319 thus reducing overall data access time.

Figure 4:
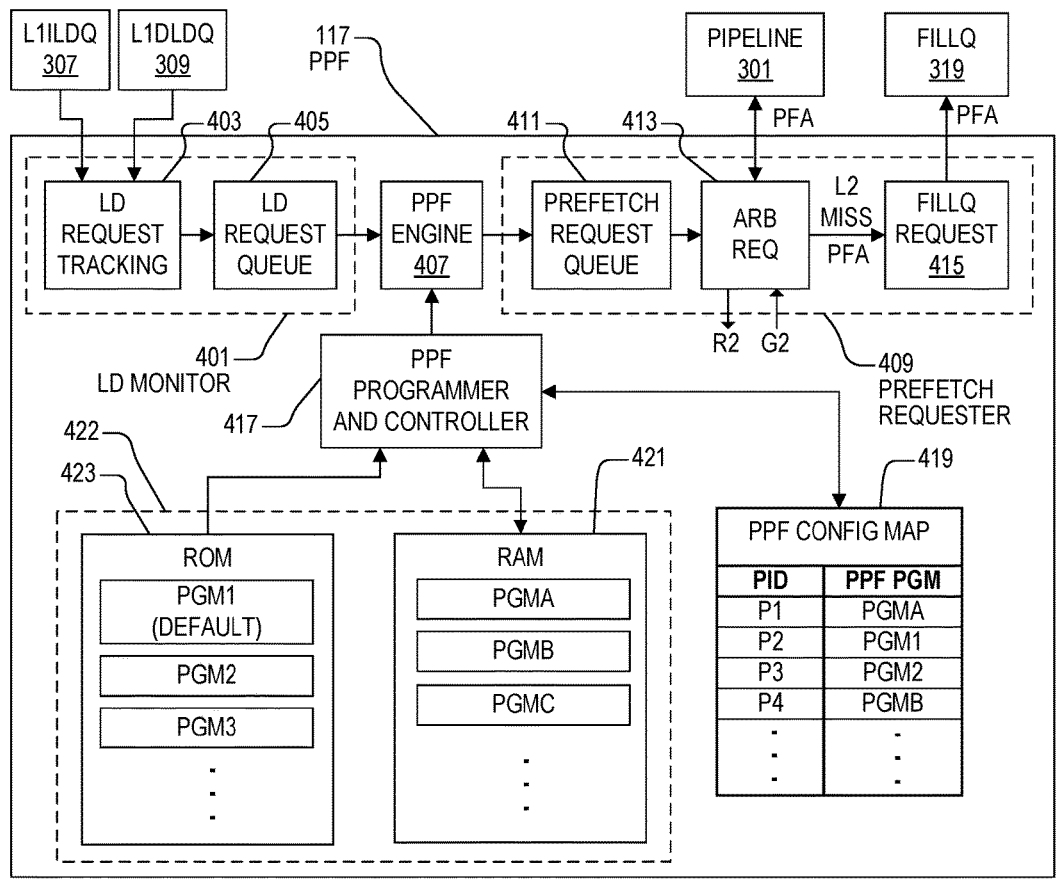
FIG. 4 is a more detailed block diagram of the programmable prefetcher of FIG. 1 implemented according to one embodiment of the present invention interfacing portions of the L2 cache of FIG. 1.

FIG. 4 is a more detailed block diagram of the PPF 117 implemented according to one embodiment of the present invention interfacing portions of the L2 cache 115. As previously described, the PPF 117, as one of the prefetchers 323, monitors load requests submitted to the queues L1ILDQ 307 and L1DLDQ 309. The load requests are tracked by a load request tracking module 403 of a load monitor 401 of the PPF 117, in which each load request is entered into a load request queue 405 of the load monitor 401. Each load request may also be identified by type, in which the type may be used by the prefetch operation to determine a method of prefetching. Load types may include an integer load (data load, prefetchable), a media load (data load, often highly prefetchable), a table walk load (generally not prefetchable), a prefetch load (sometimes prefetchable, unless prefetching in response to a prefetch load), a code (or instruction) load (often prefetchable, but usually optimal with a different algorithm as compared to a data load), etc.

A PPF engine 407 scans the load request queue 405 for each load request, and determines and loads one or more prefetch addresses into a prefetch request queue 411 of a prefetch requester 409 of the PPF 117. An arbitration request (ARB REQ) module 413 accesses each of the prefetch addresses in the prefetch request queue 411 and requests access to the pipeline 301 by asserting the request signal R2. When the arbiter 327 grants access to the pipeline 301, it asserts the corresponding grant signal G2, and the arbitration request module 413 accesses and queries the pipeline 301 for one or more prefetch addresses (PFA) in the prefetch request queue 411. In the event of a hit, such as when the cache line(s) at the prefetch address(es) PFA is (are) already loaded into the data array 305 and is (are) valid, the prefetch address(es) PFA may be discarded. In the event of a miss, the arbitration request module 413 provides the prefetch address(es) PFA to a FILLQ request module 415 of the prefetch request module 409. The FILLQ request module 415 inserts the prefetch address(es) PFA into the FILLQ 319, or otherwise requests that the FILLQ 319 submit a request to the RS1 107, in order to request the corresponding cache line(s) from the system memory 113.

The load monitor 401 and the prefetch requester 409 of the PPF 117 generally include or otherwise perform standard or otherwise immutable functions that may be performed by one or more of the prefetchers 323, so that they need not be programmable. The load monitor 401 simply includes and loads the load request queue 405 with the load requests that have been made (including, for example, address and load type), and the prefetch requester 409 includes and simply accesses the prefetch request queue 411 to make prefetch requests using prefetch addresses listed therein. The load monitor 401 and the prefetch requester 409 may thus be fixed and optimized in hardware to achieve optimal performance.

The PPF engine 407, on the other hand, may be programmed with one or more prefetch programs, in which an activated one of the prefetch programs operates the PPF engine 407 according to a prefetch definition or algorithm during execution of a corresponding process. A PPF programmer and controller 417 is included in the PPF 117 and is used to program the PPF engine 407 with one or more prefetch programs and to control operation of the PPF engine 407 including activation of a loaded prefetch program. It is possible that in response to a WRITE_PPF instruction (such as the WRITE_PPF instruction in the header 121 of the binary APP 119), the PPF programmer and controller 417 accesses or otherwise receives the identified prefetch program (e.g., PGMA_PPF) and directly programs the PPF engine 407. The PPF engine 407 may be configured with sufficient resources to be programmed with multiple prefetch programs, in which the PPF programmer and controller 417 simply activates the appropriate prefetch program associated with the particular process that is active.

In order to facilitate multiple prefetch programs, a PPF configuration map 419 is provided that maps each process being executed (either active or suspended) identified by a unique process identifier (PID) with a corresponding prefetch program provided for that process. As shown, for example, several processes are identified as P1, P2, P3, P4, etc., associated with corresponding prefetch programs PGMA, PGM1, PGM2, PGMB, etc., respectively. The PPF programmer and controller 417 identifies the active process at any given time and activates the corresponding prefetch program programmed within the PPF engine 407 according to the mapping provided in the PPF configuration map 419. Once the correct prefetch program is activated, the PPF 117 operates as a selected, desired or custom prefetcher during execution of the corresponding process.

It is appreciated that the PPF engine 407 may be a limited resource in which a limited number of prefetch programs may be loaded at any given time. The number of processes that may be executing (either active or suspended) may be rather large, and if a significant number include at least one corresponding prefetch program, then the PPF engine 407 may not have sufficient capacity to be programmed with a corresponding number of prefetch programs. In such a configuration it may be difficult to switch programming of the PPF engine 407 with different prefetch programs for different processes over time, particularly when the location information for one or more of the prefetch programs is no longer valid or unavailable. Also, the PPF engine 407 may include sufficient resources to be programmed with one large or two smaller prefetch programs depending upon the configuration.

A local prefetch memory 422 may be included and coupled to or otherwise provided within the PPF 117. The prefetch memory 422 may include a programmable random access memory (RAM) 421 (e.g., a static RAM or the like) that may be written with one or more prefetch programs, shown as PGMA, PGMB, PGMC, etc. In one embodiment, each of the prefetch programs may be a binary stream of bits so that the RAM 421 may be implemented sufficiently large to store an appreciable number of prefetch programs. In this case, in response to a WRITE PPF instruction (such as the WRITE_PPF instruction in the header 121 of the APP 119), the processing core C1 in cooperation with the PPF programmer and controller 417 accesses the identified prefetch program (e.g., PGMA_PPF) and loads it into the RAM 421 rather than directly into the PPF engine 407. The PPF programmer and controller 417 further updates the PPF configuration map 419 to map the prefetch program with the corresponding process. In response to a prefetch configuration instruction CONFIG_PPF (such as the CONFIG_PPF instruction in the header 121 of the binary APP 119), the PPF programmer and controller 417 programs the PPF engine 407 with the identified prefetch program, such as the prefetch program PGMA from the RAM 421. It is noted that a given process may use multiple prefetch programs, in which the PPF programmer and controller 417 maps multiple prefetch programs for a given process, e.g., P1A, P1B, etc. The PPF programmer and controller 417 further uses the PPF configuration map 419 to identify the last prefetch program that was active for the process if and when suspended.

The prefetch memory 422 may also include a read-only memory (ROM) 423 for storing one or more standard or predetermined prefetch programs, shown as PGM1, PGM2, PGM3, etc. In one embodiment, one of the predetermined prefetch programs may be designated as a default prefetch program (e.g., PGM1). During initial startup of the processor 100 and/or the processing core C1, the PPF programmer and controller 417 programs the PPF engine 407 with the default prefetch program, if included, and then activates the default prefetch program of the PPF engine 407. The application or process may include a prefetch configuration instruction CONFIG_PPF that identifies any of the predetermined prefetch programs stored within the ROM 423. In this case, the PPF programmer and controller 417 may map each process with the default prefetch program unless and until superseded by another. In response to each subsequent PPF configuration instruction, the PPF programmer and controller 417 programs the PPF engine 407 with the identified predetermined prefetch program from the ROM 423 in a similar manner as described for the RAM 421, and then updates the PPF configuration map 419. As shown, for example, processes P2 and P3 are mapped to PGM1 and PGM2, respectively.

When the processing core C1 switches activation from one process to another, the PPF programmer and controller 417 consults the PPF configuration map 419 and determines whether the prefetch program associated with the process being activated is already loaded within the PPF engine 407. If so, then the PPF programmer and controller 417 deactivates the current prefetch program, if any, and activates the next prefetch program in the PPF engine 407 for the process being activated. If the PPF engine 407 is not loaded with the next prefetch program for the process being activated, then the PPF programmer and controller 417 accesses either the RAM 421 or the ROM 423 that stores the next prefetch program and programs the PPF engine 407 accordingly.

In one embodiment, the PPF programmer and controller 417 identifies whether the PPF engine 407 has sufficient available space to program the next prefetch program without overwriting any prefetch programs currently loaded within the PPF engine 407. If so, then the next prefetch program is loaded into the available space. If, however, the PPF engine 407 does not have sufficient available space to load the next prefetch program, then the PPF programmer and controller 417 uses a replacement policy to overwrite one or more prefetch programs currently residing within the PPF engine 407. The replacement policy may be a least-recently used (LRU) algorithm or the like, but may also take into consideration the amount of programmable space needed for the prefetch program being loaded. For example, if a smaller least recently used prefetch program would not otherwise provide sufficient space for the next prefetch program to be loaded, then a larger prefetch program may be selected and overwritten even if more recently used. In one embodiment, if a copy of any prefetch program being overwritten within the PPF engine 407 is not stored within the ROM 423 or the RAM 421, and if the RAM 421 has sufficient available storage, then the PPF programmer and controller 417 may unload or copy the prefetch program from the PPF engine 407 into the RAM 421 before it is overwritten in the PPF engine 407.

Although the RAM 421 may store an appreciable number of prefetch programs, in the event that the RAM 421 is not large enough to store all of the prefetch programs that are attempted to be loaded at any given time, then the PPF programmer and controller 417 may take appropriate action. For example, if a process attempts to configure a prefetch program that is not found or otherwise not available, then the PPF programmer and controller 417 may simply disable the operation of the PPF engine 407 for that process. Alternatively, the PPF programmer and controller 417 may load or otherwise activate a standard prefetch program, such as the default prefetch program PGM1, as long as any other prefetch program is not permanently overwritten.

Figure 5:
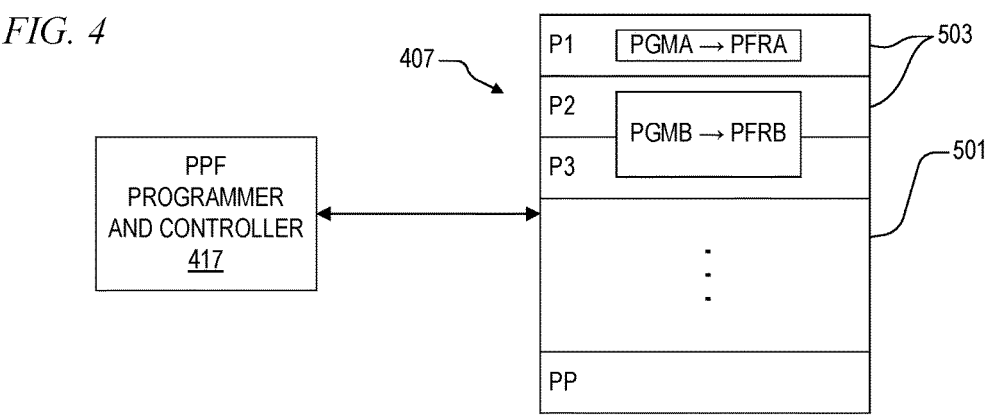
FIG. 5 is a is a simplified block diagram of the PPF programmer and controller interfaced with the PPF engine of FIG. 4, which is implemented according to one embodiment of the present invention using programmable logic.

FIG. 5 is a is a simplified block diagram of the PPF programmer and controller 417 interfaced with the PPF engine 407, which is implemented according to one embodiment of the present invention using programmable logic 501. In the illustrated embodiment, the programmable logic 501 is subdivided into a set of "P" substantially identical programmable sections 503, individually shown as programmable sections P1, P2, . . . , PP, in which "P" is a positive integer. The PPF programmer and controller 417 programs one or more prefetch programs into the programmable logic 501 to implement a corresponding prefetcher. In particular, the PPF programmer and controller 417 allocates one or more of the programmable sections 503 sufficient to program a prefetch program, and then loads the prefetch program into the allocated section(s) 503 to implement a corresponding prefetcher within the PPF engine 407. The PPF programmer and controller 417 keeps a pointer or the like to identify and locate each prefetch program loaded into the PPF engine 407, and activates or deactivates loaded prefetch programs based on the active process.

The programmable logic 501 may be a relatively large resource, such as implemented by a field programmable gate array (FPGA) or the like, to program multiple prefetch programs at a time for each of multiple application processes. Nonetheless, the programmable logic 501 is a limited resource in that remaining un-allocated sections 503 may be insufficient to program a new prefetch program to be programmed. In such event, the PPF programmer and controller 417 may copy an existing prefetch program from the programmable logic 501 into the RAM 421 if a copy does not already exist in the RAM 421 and if sufficient space is available therein, and then program allocated sections 503 with the new prefetch program. When a process has completed operation such that it is terminated, any prefetch programs that have been programmed for that process may be invalidated and eventually overwritten within the PPF engine 407 and/or the RAM 421.

Each programmable section 503 may include sufficient programmable logic to perform a simple prefetch program. As shown, for example, a first prefetch program PGMA (relatively simple) is loaded into a first programmable section P1 to implement a first prefetcher PFRA, and a second prefetch program PGMB (more complex) is loaded into two programmable sections P2 and P3 to implement a second prefetcher PFRB. In addition, even more complicated prefetch programs may be loaded into more than two of the sections 503. Any number of prefetch programs may be programmed into the programmable logic 501 depending upon the relative size and complexity of the prefetch programs and the total number of programmable sections 503.

In one embodiment, the PPF programmer and controller 417 performs dynamic allocation in which it identifies the next section 503 available for allocation and begins programming as it scans a new prefetch program. If the prefetch program continues after a first allocated section 503 has been completely programmed such that additional sections 503 are needed to complete the programming, additional sections are dynamically allocated on the fly until the prefetch program is completely programmed into the PPF engine 407. In one alternative embodiment, the PPF programmer and controller 417 first evaluates the size of the new prefetch program and allocates the appropriate number of programmable sections 503 accordingly prior to programming. In another alternative embodiment, the prefetch program may be configured to include a resource statement (RSRC) 903 or the like (FIG. 9) that indicates the number of sections 503 (or at least the number and type of programmable elements) that are needed for the prefetch program. In this case, the PPF programmer and controller 417 retrieves the resource statement 903, pre-allocates the indicated number of sections 503, and then programs the allocated sections using the prefetch program.

Once a prefetch program is programmed into the programmable logic 501 for a given process and the PPF configuration map 419 is updated accordingly, the PPF programmer and controller 417 monitors or is otherwise provided process information regarding the active process and enables the corresponding prefetch program to operate during that process.

Figure 6:
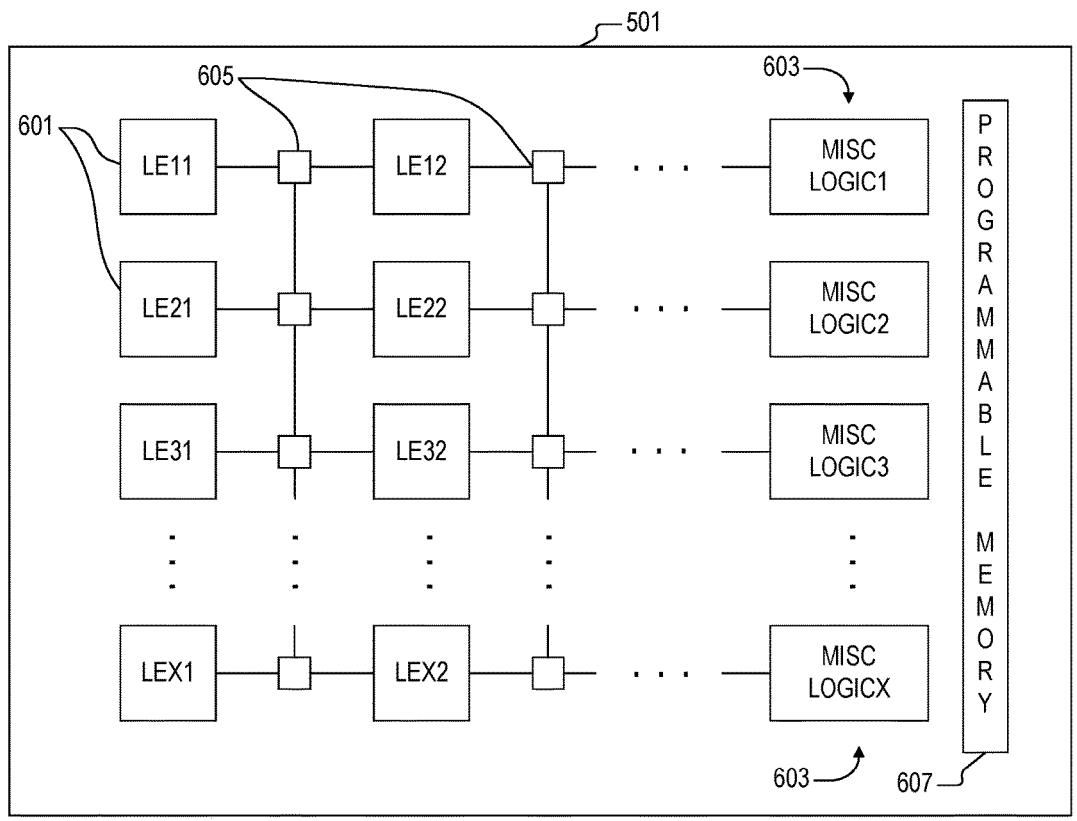
FIG. 6 is a more detailed block diagram of the programmable logic of FIG. 5 implemented according to one embodiment of the present invention.

FIG. 6 is a more detailed block diagram of the programmable logic 501 implemented according to one embodiment of the present invention. The illustrated programmable logic 501 includes an array of programmable elements including programmable logic elements (LE) 601 shown arranged in an XY matrix of logic elements 601, individually shown as LExy in which x and y denote row and column indices, respectively, of the array. Each row further includes at least one of an array of miscellaneous logic blocks 603, each including supporting logic to supplement the matrix of logic elements 601. Each miscellaneous logic block 603 may include, for example, one or more storage elements, one or more registers, one or more latches, one or more multiplexers, one or more adders (to add or subtract digital values), a set of Boolean logic elements or gates (e.g., logic gates such as OR gates, AND gates, inverters, exclusive-OR (XOR) gates, etc.), etc. Each miscellaneous logic blocks 603 may include one or more registers configured as shift registers or data swizzlers or the like for flexible data manipulation. The logic elements 601 and the miscellaneous logic blocks 603 are coupled together with a routing mesh that includes a matrix of programmable crossbar switches or interconnectors 605. Each programmable interconnector 605 includes multiple switches to selectively connect the programmable devices together. The routing mesh includes sufficient connectivity to connect multiple ones of the logic elements 601 and miscellaneous logic blocks 603 together to perform simple processing operations and more complicated processing operations.

As further described herein, each programmable section 503 includes one or more programmable elements (logic elements 601, logic blocks 603), and corresponding routing mesh (interconnectors 605) for selectively connecting the devices and elements together to implement a corresponding prefetcher, prefetch function or prefetcher portion. The routing mesh is a switching matrix that includes multiple switches and the like for redirecting inputs and outputs between the logic elements 601 and miscellaneous logic blocks 603.

The programmable logic 501 incorporates programmable memory 607 that is used to receive a prefetch program to program selected ones of the logic elements 601, corresponding miscellaneous logic blocks 603, and the programmable interconnectors 605 in such a manner as to create a corresponding prefetcher. The programmable memory 607 may also include storage locations or registers or the like to receive input operands or values and to store output results of a prefetch program. The programmable memory 607 is distributed among the programmable sections 503 of the programmable logic 501, and may be used by each of the programmable sections 503 individually or collectively among selected allocated sections 503 performing a specific prefetch operation. The programmable memory 607 may be configured as private memory space within the programmable logic 501 or even within the processing core C1 and not externally accessible. The memory 607 may be implemented in any suitable manner such as static random-access memory (SRAM) or the like.

Figure 7:
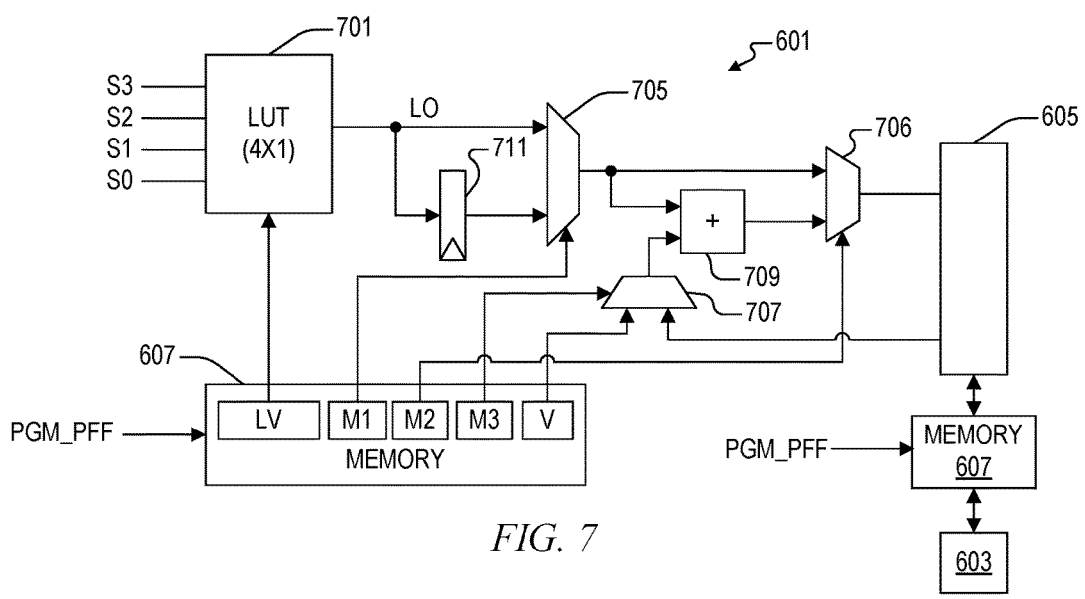
FIG. 7 is a schematic and block diagram of a programmable logic element of FIG. 6 implemented according to one embodiment of the present invention.

FIG. 7 is a schematic and block diagram of a programmable logic element 601 implemented according to one embodiment of the present invention. The logic element 601 includes a look-up table (LUT) 701, three 2-input multiplexers (MUXes) 705, 706 and 707, a 2-input adder 709, and a clocked register (or latch) 711. A portion of the programmable memory 607 is shown that is used to program portions of the logic element 601, any included miscellaneous logic blocks 603, and one or more interconnectors 605. As noted above, the programmable memory 607 may be used to provide input values, to store output results, and/or to store intermediate values that are updated for each of multiple iterations of a processing operation.

As shown, the memory 607 is programmed using a prefetch program shown as PGM_PFF. The LUT 701 is illustrated as a 4X1 LUT that is programmed with corresponding LUT value (LV) bits in the memory 607. Each of the MUXes 705, 706 and 707 has a select input controlled by a corresponding memory bit stored in the memory 607, shown as memory bits M1, M2, and M3, respectively. The output of the LUT 701, shown as LO, is provided to one input of the MUX 705 and to an input of the register 711, having its output provided to the other input of the MUX 705. The output of the MUX 705 is provided to one input of the MUX 706 and to one input of the adder 709. The output of the adder 709 is provided to the other input of the MUX 706, having its output provided to an input of the programmable interconnectors 605. The memory 607 includes a programmable bit V that is provided to one input of the MUX 707, having its other input coupled to an output of the programmable interconnectors 605, and having its output provided to the other input of the adder 709. The output of the adder 709 is provided to the other input of the MUX 706. The memory 607 may also be used to program corresponding portions of the interconnectors 605 and any miscellaneous logic blocks 603.

The illustrated logic element 601 is exemplary only and alternative versions are contemplated depending upon the particular configuration. The logic element 601 may be configured on a bit-slice granularity level for handling a single bit of a data value. For data values including multiple bits, multiple bit-slice logic elements are used. For example, for 64-bit data values, 64 bit-slice logic elements are used in parallel.

In operation, the memory 607 is programmed with the LUT data values (LV) of the LUT 701, the select inputs M1-M3 of the MUXes 705-707, and a programmable data value V provided to an input of the MUX 707. Four input values S0-S3 are provided from an operand of the instruction, from the memory 607, or from another programmed block to select one of 16 values programmed into the LUT 701, in which the selected value is provided at its output as LO. The MUX 705 is programmed to directly provide the LO output of the LUT 701 or to provide a registered version thereof. A registered version may be used to insert latency for purposes of timing of the prefetch operation. The MUX 706 is programmed to directly provide the output of the MUX 705 or to provide an output of the adder 709 to the interconnector 605 to be provided as an output or to be provided to another programmed block. The adder 709 adds a selected value to the output of the MUX 705, in which the selected value is the programmed value V or is from an output of the interconnector 605 (provided from another input or from another programmed block).

FIG. 8 is a schematic diagram of the LUT 701 implemented according to one embodiment of the present invention. A set of 2-input MUXes organized as a binary MUX tree is provided for choosing between 16 input values LV0-LV15 based on the select input S3:S0 (in which S0 is the least significant bit). The LV0-LV15 are programmed into the memory 607 as previously described. Each consecutive pair of the 16 input values LV0-LV15 (LV0&LV1, LV2&LV3, etc.) are provided to corresponding pairs of inputs of eight 2-input MUXes 801 each receiving S0 at its select input. Each consecutive pair of the eight outputs of the MUXes 801 are provided to the corresponding pairs of inputs of four 2-input MUXes 803 each receiving S1 at its select input. Each consecutive pair of the four outputs of the MUXes 803 are provided to the corresponding pairs of inputs of two 2-input MUXes 805, each receiving S2 at its select input. The pair of outputs of the MUXes 805 are provided to the pair of inputs of an output MUX 807 receiving S3 at its select input and providing the LUT output LO at its output. It is appreciated that the configuration shown in FIG. 8 is only one of many suitable LUT implementations as understood by those of ordinary skill in the art.

FIG. 9 is a simplified block diagram of a format of a prefetch program PGM_PFF 901 for programming the PPF engine 407 according to one embodiment of the present invention. In this case, the PGM_PFF 901 may include a resource statement (RSRC) 903 that indicates the amount of resources needed within the programmable logic 501 for implementing the prefetch program. As an example, the resource statement 903 may indicate the number of programmable sections P needed to complete the programming. The PPF programmer and controller 417 may read the resource statement 903 during programming of the PPF engine 407 to allocate a corresponding number of the programmable sections 503. Although a greater degree of granularity may be used, such as by tracking each logic element 601, miscellaneous logic block 603, programmable interconnector 605 and/or amount of the programmable memory 607, such may require the PPF programmer and controller 417 to track each of the individual elements of the programmable logic 501 over time.

The PGM_PFF 901 may further include a series of logic ones (1s) and zeros (0s) otherwise referred to as a bit stream. In one embodiment, for example, in response to a configuration instruction received by the processing core C1, the PPF programmer and controller 417 aligns the programmable memory (including the programmable memory 607 and corresponding programmable memory of the interconnectors 605) of allocated ones of the programmable sections 503 into a large serialized shift register, then shifts in the bit stream until fully loaded within each of the allocated sections, then de-aligns the programmable memory and provides a pointer to locate or identify the programmed prefetcher. Alternative programming methods and formats may be used including parallel programming. Also, the resource statement may be provided at any suitable location, such as at the beginning or the end, to be read by the PPF programmer and controller 417 to ensure proper programming.

Figure 10:
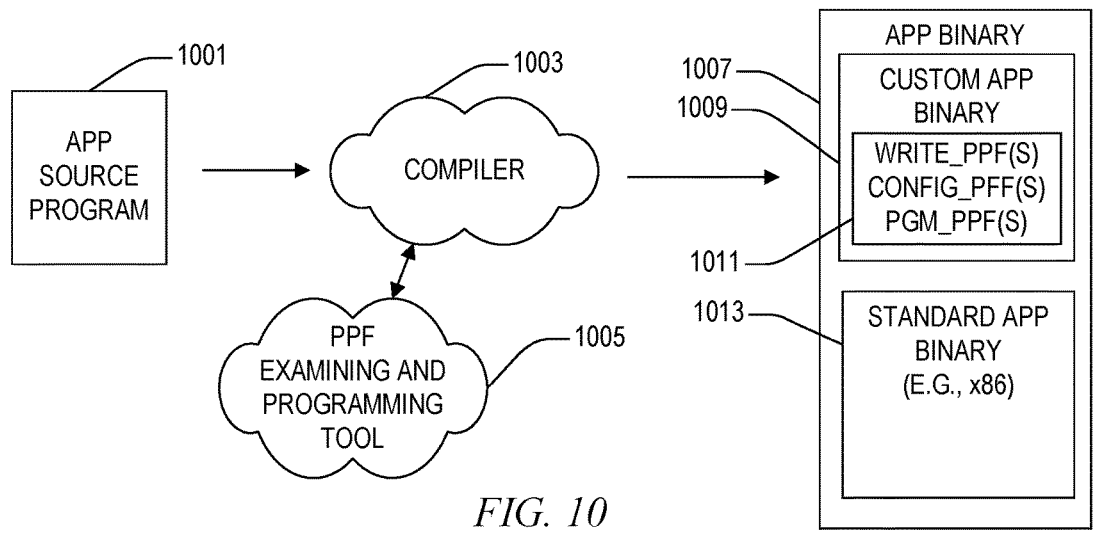
FIG. 10 is a simplified block diagram illustrating one method of generating an executable application incorporating one or more prefetch programs and the corresponding prefetch programming instructions according to one embodiment of the present invention.

FIG. 10 is a simplified block diagram illustrating one method of generating an executable application incorporating one or more prefetch programs and the corresponding prefetch programming instructions according to one embodiment of the present invention. An application generator, such as a programmer or the like, writes an application source program 1001 in any suitable high level programming language, such as, for non-limiting examples, C, C++, BASIC, Cobol, Fortran, Pascal, Ada, JavaScript, etc. In this case the application generator need not be particularly aware of the capabilities of the processor 100 and/or the processing core C1 incorporating the PPF 117. The application source program 1001 is provided to a compiler 1003 suitable for converting the selected high level programming language into a binary application file 1007 executable by the processor 100. A PPF examining and programming tool 1005 is either incorporated within the compiler 1003 or is otherwise linked to the compiler 1003.

During the compile process, the PPF examining and programming tool 1005, in cooperation with the compiler 1003, executes examination or optimization routines or the like that examine the code of the application source program 1001 to determine any prefetch patterns or operations may be utilized. For example, the examination routines determine any particular portions of the code that retrieve information according to particular prefetch patterns or that employs content-directed prefetch algorithms or the like during execution. The examination routines may scrutinize any load instructions, particularly those incorporated within code loops or that are involved in loading information in repetitive and possibly predictable patterns. The PPF examining and programming tool 1005 determines whether a custom prefetch definition may be used to optimize prefetch operations for the application source program 1001. If so, the PPF examining and programming tool 1005 develops one or more prefetch programs PGM_PPF(s) that may be used during execution of the binary application file 1007. The compiler 1003, in cooperation with the PPF examining and programming tool 1005, incorporates one or more prefetch programs PGM_PPF(s) into a custom binary application file 1009 as shown at 1011. The compiler 1003 also generates the corresponding PPF write and configuration instructions WRITE_PPF(s) and CONFIG_PPF(s) into the custom binary application file 1009 as shown at 1011 to cause the processing core C1 of the processor 100 to load and program the PGM_PPF(s) into the PPF 117 during execution of the custom binary application file 1009. The custom binary application code 1009 has a similar format as the binary APP 115 previously described.

The PPF examining and programming tool 1005 may, in addition or in the alternative, may also determine that one of the predetermined prefetch programs PGM1, PGM2, PGM3, etc., programmed into the ROM 423 may be suitable to optimize prefetch operations during execution of the binary application file 1007, so that the custom binary application file 1009 may incorporate one (or more) PPF configuration commands each for loading an identified one of the predetermined prefetch programs.

The custom binary application code 1009 may be loaded into the system memory 113 and executed by the processor 100 in a similar manner previously described for the binary APP 115. The custom binary application code 1009 incorporates one or more suitable PPF write and/or configuration instructions to load one or more prefetch programs and to program the PPF 117 accordingly. In some configurations or implementations, the custom binary application code 1009 may not execute properly. For example, an incorrect or incompatible version of the PPF examining and programming tool 1005 or the compiler 1003 or an incompatible version of the processor 100 may cause such incorrect operation. In the illustrated embodiment, the compiler 1003 may also generate standard binary application code 1013 that is also incorporated within the binary application file 1007. In the event that the custom binary application code 1009 fails to load into the processor 100 correctly, the standard binary application code 1013 is loaded instead.

In one embodiment, the custom binary application code 1009 and the standard binary application code 1013 are both complete versions in which each may be executed separately or independently by a compatible processor. Alternatively, the standard binary application code 1013 may be configured to include patch code or the like to replace code portions of the custom binary application code 1009 in the event that the custom binary application code 1009 fails to load. Thus, in this case the standard binary application code 1013 is not a complete version but instead supplements the custom binary application code 1009 to patch over incompatible PPF portions of the code.

Figure 11:
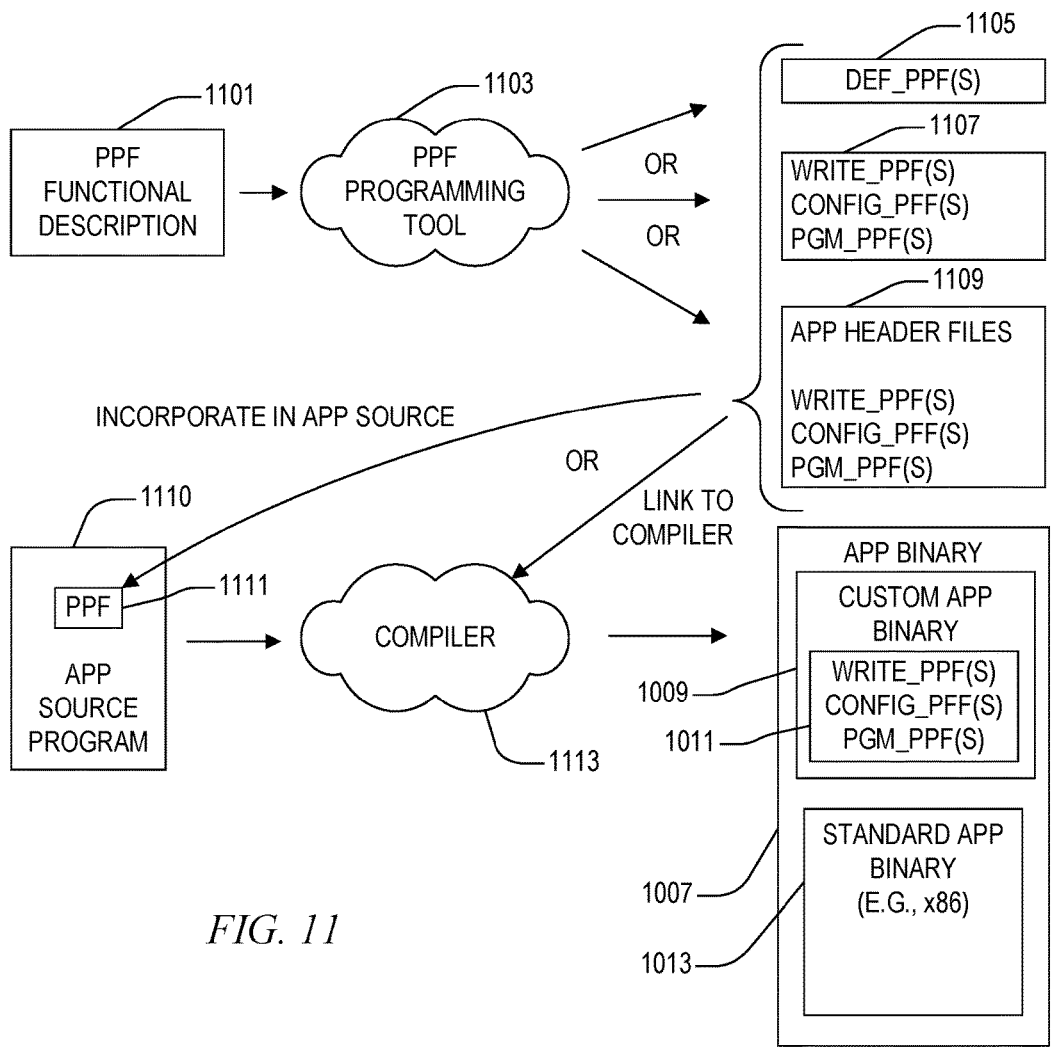
FIG. 11 is a simplified block diagram illustrating another method of generating an executable application incorporating one or more prefetch programs and the corresponding prefetch programming instructions according to another embodiment of the present invention.

FIG. 11 is a simplified block diagram illustrating another method of generating an executable application incorporating one or more prefetch programs and the corresponding prefetch programming instructions according to another embodiment of the present invention. In this case, the application generator writes a PPF functional description 1101 in a selected format that describes or otherwise defines optimal prefetch operation. The PPF functional description 1101 may be written in any suitable hardware programming language, such as LegUp, Catapult (by Catapult technology), Verilog, HDL (Hardware Description Language), register control logic (RCL), register transfer logic (RTL), etc. The PPF functional description 1101 is provided to a corresponding PPF programming tool 1103 that is configured to convert the PPF functional description 1101 into a prefetch program suitable to program the PPF 117 to operate according to the PPF functional description 1101. The PPF functional description 1101 may otherwise be referred to as a prefetch definition.

The PPF programming tool 1103 may be configured to convert the PPF functional description 1101 into any one of several different types outputs depending upon the configuration. In one embodiment, the PPF programming tool 1103 outputs one or more blocks of programming information 1105 for a corresponding one or more prefetch programs PGM_PPF(s) configured by the programmer. In another embodiment, the PPF programming tool 1103 outputs a file 1107 including PPF write and/or PPF configure instructions and corresponding prefetch programs PGM_PPF(s). In yet another embodiment, the PPF programming tool 1103 outputs one or more application header files 1109 including the PPF write and/or PPF configure instructions and corresponding prefetch programs PGM_PPF(s).

A suitable application generator incorporates the output of the PPF programming tool 1103 into an application source program 1110 to generate the binary application file 1007. The application generator incorporates the output of the PPF programming tool 1103 as PPF information 1111 incorporated into the application source program 1110. As an example, the application source program 1001 may be modified by or otherwise supplemented by the PPF information 1111 to create the application source program 1110. The PPF information 1111 may include the PPF write and/or PPF configure instructions and corresponding prefetch programs PGM_PPF(s) as previously described. The modified or supplemented application source program 1110 is then provided to a suitable compiler 1113, which generates the binary application file 1007 previously described.

In another case, the application generator links the output of the PPF programming tool 1103 to the compiler 1113 when compiling the original and unmodified application source program 1001, and the compiler 1113 supplements the information from the application source program 1001 with the output of the PPF programming tool 1103 to generate the binary application file 1007.

Figure 12:
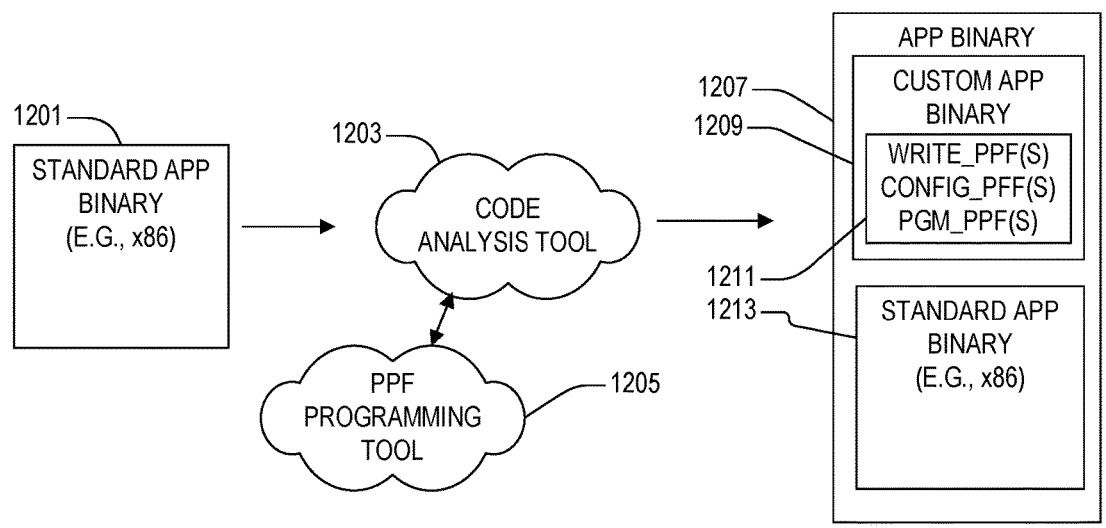
FIG. 12 is a simplified block diagram illustrating yet another method of generating an executable application incorporating one or more prefetch programs for programming a programmable prefetcher according to yet another embodiment of the present invention.

FIG. 12 is a simplified block diagram illustrating yet another method of generating an application incorporating one or more prefetch programs for programming a programmable prefetcher according to yet another embodiment of the present invention. In this case, a compiled executable program, such as any existing or legacy or newly generated application, shown as a "standard" binary application code 1201 (e.g., generated in a conventional manner), is processed by a code analysis tool 1203 that executes examination routines and the like to determine whether prefetch optimizations may be utilized or generated. For example, the examination routines determine any particular portions of the code that retrieve information in a pattern that would benefit from particular prefetch patterns or content-directed prefetch algorithms or the like during execution. The examination routines may scrutinize any load instructions, particularly those incorporated within code loops or that are involved in loading information in repetitive and possibly predictable patterns.

The code analysis tool 1203 determines whether one or more of the predetermined prefetch programs in the ROM 423 may be used to optimize prefetch operations during execution of the standard binary application code 1201. Alternatively, or in addition, the code analysis tool 1203 identifies any custom prefetch algorithms that may be used to optimize prefetching during execution of the standard binary application code 1201. If a custom prefetch definition is identified, then the code analysis tool 1203 consults a PPF programming tool 1205 to generate one or more prefetch programs that may be used to program a PPF of a processor, such as the PPF 117 of the processing core C1 of the processor 100. The PPF programming tool 1205 converts any custom prefetch definitions determined by the code analysis tool 1203 into corresponding prefetch programs, which are incorporated into a custom binary application file 1209 of an output binary application file 1207 (similar to the binary application file 1007 including the custom binary application file 1009). The custom binary application file 1209 incorporates one or more prefetch programs PGM_PPF(s), and corresponding PPF write and configuration instructions WRITE_PPF(s) and CONFIG_PPF(s) into the custom binary application file as shown at 1211, similar to that described for the custom binary application file 1009. The binary application file 1207 may also include a standard binary application code 1213 similar to the standard binary application code 1013 previously described.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the circuits described herein may be implemented in any suitable manner including logic devices or circuitry or the like. Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

The invention claimed is:
1. A processor, comprising:
 a memory system comprising at least one cache for storing information retrieved from an external system memory;
 a front end that converts fetched program instructions into microinstructions including load microinstructions and that dispatches said microinstructions for execution;

at least one load pipeline that executes dispatched load microinstructions and that provides a plurality of load requests to said memory system; and wherein said memory system comprises a programmable prefetcher for prefetching information from the system memory, comprising:

a load monitor that tracks said plurality of load requests;

a programmable prefetch engine that is configured to be programmed by at least one prefetch program to operate as a programmed prefetcher, wherein during operation of the processor, said programmed prefetcher generates at least one prefetch address based on said plurality of load requests; and a prefetch requester that submits said at least one prefetch address to prefetch information from said memory system;

wherein said programmable prefetch engine comprises a plurality of programmable logic elements and a plurality of programmable interconnectors.

2. The processor of claim 1, further comprising a prefetch memory for storing said at least one prefetch program.

3. The processor of claim 2, wherein said prefetch memory comprises a random-access memory that stores said at least one prefetch program retrieved via said memory system.

4. The processor of claim 3, wherein the processor is responsive to a write command to write said at least one prefetch program into said random-access memory.

5. The processor of claim 2, further comprising a prefetch programmer that programs said programmable prefetch engine using said at least one prefetch program stored in said prefetch memory.

6. The processor of claim 5, wherein said prefetch memory comprises a read only memory that stores at least one predetermined prefetch program for programming said programmable prefetch engine to operate according to a predetermined prefetch definition.

7. The processor of claim 6, wherein said at least one predetermined prefetch program comprises a default prefetch program, and wherein said prefetch programmer uses said default prefetch program to program said programmable prefetch engine upon startup of the processor.

8. The processor of claim 5, wherein the processor is responsive to a configure command that causes said prefetch programmer to program said programmable prefetch engine with a specified one of a plurality of prefetch programs stored in said prefetch memory.

9. The processor of claim 2, further comprising a configuration map that maps each of a plurality of different processes with a corresponding one of a plurality of prefetch programs stored in said prefetch memory.

10. The processor of claim 1, wherein said plurality of programmable logic elements and said plurality of programmable interconnectors are subdivided into a plurality of substantially identical programmable sections, further comprising a prefetch programmer that allocates a number of said programmable sections and that programs said allocated number of said programmable sections with one of said at least one prefetch program to configure said programmed prefetcher.

11. The processor of claim 1, wherein said plurality of programmable logic elements comprises a plurality of programmable lookup tables.

12. The processor of claim 1, wherein said plurality of programmable logic elements comprises a plurality of adders, a plurality of multiplexers, and a plurality of registers.

13. The processor of claim 1, wherein said programmable prefetch engine comprises a programmable memory and wherein said at least one prefetch program comprises a bitstream that is scanned into said programmable memory of said programmable prefetch engine.

14. The processor of claim 1, wherein said programmable prefetch engine is programmed with a plurality of prefetch programs, further comprising a prefetch programmer that enables at least one of said plurality of prefetch programs at a time during operation of the processor.

15. The processor of claim 1, wherein said memory system comprises a cache that receives said plurality of load requests issued by the processor, and that requests and stores corresponding cache lines from the external memory.

16. The processor core of claim 15, wherein said cache comprises a unified cache that receives code and data load requests.

* * * * *